Aug. 3, 1926.
H. T. RIBERDY
WHEEL PULLER
Filed Jan. 12, 1925
1,594,468
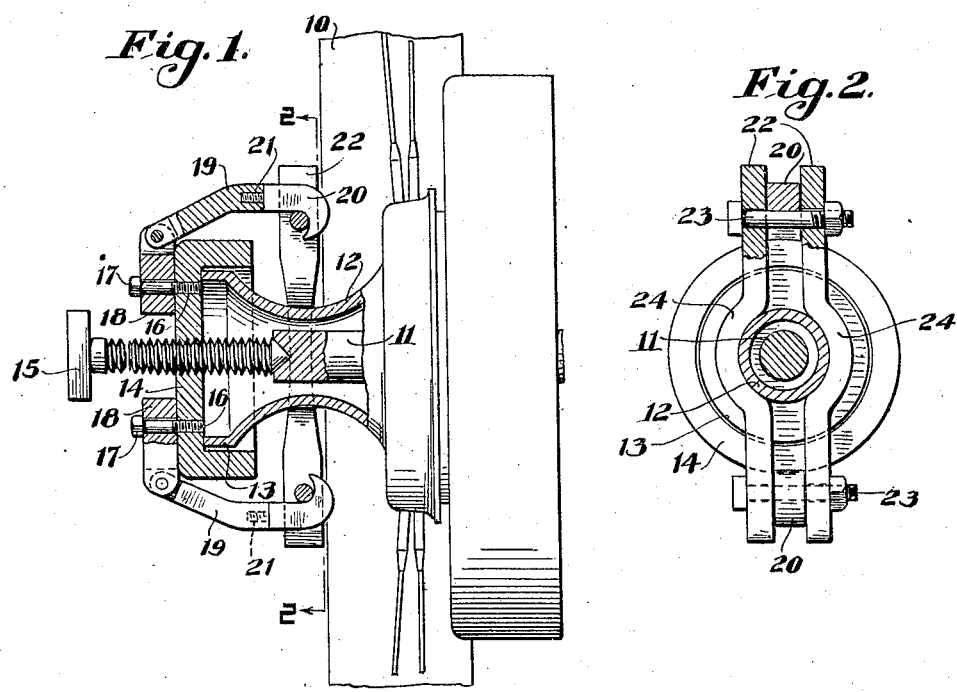
INVENTOR
Henry T. Riberdy
BY
ATTORNEY Patented Aug. 3, 1926.

1,594,468

UNITED STATES PATENT OFFICE.

HENRY THEODORE RIBERDY, OF ROCKFORD, ILLINOIS, ASSIGNOR OF ONE-HALF TO WILLIAM T. ROBERTSON, OF ROCKFORD, ILLINOIS.

WHEEL PULLER.

Application filed January 12, 1925. Serial No. 1,818.

This invention relates to an implement for pulling wheels, gears and similar rotatable elements from the shafts or axles on which they are mounted.

The general object of the invention is to provide an improved puller which is universally adaptable to all styles of automobile wheels, whether wooden, wire or disk type, and which may be also used for pulling gears and the like. It includes a head through which a screw is threaded for engaging the end of the shaft or axle, and which is provided with swivel members or threaded sockets for receiving hooks, so that the latter may be turned at an angle to hook over the disk or spoke, according to the particular job in hand. A clamp is provided for use in connection with the head and hooks on certain types of wheels, as will be hereinafter more fully explained in connection with the accompanying drawings illustrating the same.

In the drawing:

Figure 1 is a section taken centrally of the puller, illustrating the same in connection with a wire wheel having a flared or flanged hub.

Figure 2 is a section taken on the line 2—2 of Figure 1.

Referring in detail to the drawings, it will be noted that the invention is shown therein as used for the removal of a wire wheel 10 from its axle 11, the wheel in this case being provided with a hub 12 having its outer end flared, as at 13. The pulling implement comprises a head or cap 14, adapted to seat over the outer end 13 of the hub, and having a screw 15 extending centrally therethrough and adapted to engage the outer end of the axle 11. The head 14 is provided near its periphery with a plurality of threaded holes 16, in which are mounted bolts or screws 17. It is preferred to provide four of these bolts, although in the application of the invention shown in the drawing, only two of them are used. Lugs 18 are secured by the bolts 17 and support the shanks 19 of hooks 20, which are removably attached to the shanks by threaded connections 21. The threaded connections permit the hooks 20 to be turned at any angle, so that they may engage the spokes of a wooden wheel, or the edges of a gear or brake drum. In the present adaptation, however, a pair of cooperating clamp bars 22 are used, which are clamped to the smallest part of the hub 12 by tightening the bolts 23, which engage the ends of the bars, the latter being provided with outwardly curved narrow portions 24 adapted to fit around the hub. When the bars 22 have been tightly clamped to the hub with the hooks 20 engaging the bolts 23 between the bars, and the head 14 guided on the outer end of the hub, the screw 15 may be tightened until the wheel is drawn from the axle.

From the foregoing description, it will be seen that I have provided a wheel puller, which is capable of a great variety of applications. The head 14 may be provided with a number of interchangeable hooks, any or all of which may be angularly adjustable with respect to their shanks.

It is apparent that the size, shape and arrangement of the various elements, which comprise the invention, may be modified to a considerable extent without departing materially from the salient features of the invention, and it is my purpose, therefore, to include all such modifications within the scope of what is claimed.

What is claimed is:

1. In a wheel puller, the combination of a head, a screw having a threaded connection with the head and adapted to engage the end of the axle, a pair of clamping bars, screw threaded means for drawing the ends of the clamping bars together, and hooks connected with said head and engageable with the screw threaded means connecting the clamping bars.

2. In a wheel puller, the combination of a head, a screw having a threaded connection with the head and adapted to engage the end of the axle, a pair of clamping bars, screw threaded means for drawing the end of the clamping bars together, and hooks having shanks connected to the head on opposite sides of the screw, said hooks being rotatably adjustable with respect to the shanks into a plane passing through the axle to engage the means connecting the clamping bars or into planes at right angles thereto to engage the spokes of a wheel.

3. In a wheel puller, the combination of a cap, a screw having a threaded connection with the center of the cap and adapted to engage the end of the axle, a pair of clamping bars, screw threaded means for drawing the ends of the clamping bars together, a plurality of shanks connected to opposite sides of the cap and terminating in threaded ends, and hooks having threaded connections with said ends so that they may be replaced by hooks of different size, said hooks being engageable with the screw threaded means connecting the ends of the clamping bars.

In testimony that I claim the foregoing as my own, I have hereto affixed my signature.

HENRY THEODORE RIBERDY.